United States Patent [19]

Steinberg

[11] Patent Number: 5,143,096

[45] Date of Patent: Sep. 1, 1992

[54] METHOD AND APPARATUS FOR EXPANDING CELLULAR MATERIALS

[75] Inventor: Ira Steinberg, East Brunswick, N.J.

[73] Assignee: The BOC Group, Inc., Murray Hill, N.J.

[21] Appl. No.: 650,322

[22] Filed: Feb. 4, 1991

[51] Int. Cl.$^5$ ............................................. A24B 15/18
[52] U.S. Cl. ..................... 131/291; 131/296; 131/300; 131/900; 426/445
[58] Field of Search ............ 131/291, 296, 900, 300; 426/445

[56] References Cited

U.S. PATENT DOCUMENTS

| | | | |
|---|---|---|---|
| 4,165,618 | 8/1979 | Tyree, Jr. | 131/291 X |
| 4,235,250 | 11/1980 | Utsch | 131/900 X |
| 4,340,073 | 7/1982 | de la Burde et al. | 131/291 |
| 4,460,000 | 7/1984 | Steinberg | 131/291 X |
| 4,561,453 | 12/1985 | Rothchild | 131/291 X |
| 4,870,980 | 10/1989 | Lowry | 131/296 |
| 4,946,697 | 8/1990 | Payne | 131/296 X |

FOREIGN PATENT DOCUMENTS

1484536   9/1977   United Kingdom ............ 131/291

Primary Examiner—Vincent Millin
Assistant Examiner—J. Doyle
Attorney, Agent, or Firm—Coleman R. Reap; Larry R. Cassett

[57] ABSTRACT

A process and apparatus for impregnating a cellular material with liquefied gas at a predetermined pressure for subsequent expansion of the impregnated cellular material including the steps of charging the cellular material into an impregnation vessel, purging the impregnation vessel with inert gas, pressurizing the impregnation vessel with inert gas to the predetermined pressure, transferring liquefied inert gas into the impregnation vessel from a process vessel in which the liquefied gas is stored at the predetermined pressure, soaking the cellular material in the liquefied inert gas for a predetermined time period, transferring unabsorbed liquefied gas from the impregnation vessel to the storage vessel, depressurizing the impregnation vessel by venting the inert gas therefrom and removing the impregnated cellular material from the impregnation vessel, the inert gas used to purge and pressurize the impregnation vessel being taken from a source completely independent of the liquefied inert gas contained in the process vessel. Pressure and temperature variation in the process vessel is minimized by using an external source of inert gas for the purging and pressurization steps.

24 Claims, 2 Drawing Sheets

METHOD AND APPARATUS FOR EXPANDING CELLULAR MATERIALS

BACKGROUND OF THE INVENTION

1. Field of the Invention

This invention relates to a process and apparatus for expanding cellular material by impregnating the cellular material with a liquefied gas at an elevated pressure, removing excess liquefied gas from the cellular material and causing the impregnated gas to vaporize, thereby expanding the cellular material. More particularly, the invention relates to a method of reducing the variation of the temperature of the liquefied gas in its storage vessel throughout the impregnation process.

2. Brief Description of the Prior Art

In the processing of cellular materials there is frequently a need or a desire to reduce the density of the material. For instance, when cellular products such as tobacco or other smoking products, fruits, vegetables, meats, cereals, and other food products are dried, they generally undergo shrinkage. It is often desirable to expand these products to modify their properties, such as burning characteristics, water absorbability, and appearance. Similarly, it is often desirable to expand other cellular materials such as cellulosic materials, for example sawdust, crushed fibre materials, etc. to increase their liquid absorbability or insulating properties.

A number of methods are known for expanding cellular materials. In general, these methods involve introducing an expanding agent, i.e. a substance capable of undergoing expansion, as by a phase change from a liquid to a gas, into the cells of the material, and causing the agent to expand. A particularly suitable method of expanding one of the above-described cellular materials comprises introducing a liquefied gas which is inert to the cellular material into a sealed vessel containing the material; soaking the cellular material in the liquefied gas sufficiently long to enable the liquefied gas to penetrate the cells of the material; removing excess liquefied gas from the cellular material; and expanding the cellular material by heating it, thereby vaporizing the liquefied gas within the cells of the material. The increased pressure of the vaporized liquefied gas in the cells causes the cellular material to expand.

It is also known to expand cellular material by impregnating it with a liquefied gas expanding agent, such as liquefied carbon dioxide, at an elevated pressure; removing excess expanding agent from the cellular material; reducing the pressure in the vessel in which the cellular material is contained, thereby causing the expanding agent to solidify; and heating the cellular material, such as by exposure to a hot gas stream, e.g. steam, air, etc., to cause the solidified expanding agent to evaporate or sublime. The solidified expanding agent vaporizes at a rate greater than the rate at which the agent in gaseous form can escape from the cellular material. As a result of this treatment, the cellular material is forced to expand.

U.S. Pat. No. 4,340,073 discloses a process and apparatus for expanding tobacco by impregnating the tobacco with carbon dioxide under conditions such that the carbon dioxide in contact with the tobacco is in liquid form, removing excess liquefied carbon dioxide from the tobacco, reducing the pressure of the impregnated tobacco to solidify carbon dioxide within the tobacco structure and rapidly heating the tobacco at atmospheric pressure to vaporize the carbon dioxide and expand the tobacco.

UK Patent Specification 1,484,536 discloses a particularly useful process for expanding an organic substance using liquid carbon dioxide. The process of this patent comprises the steps of pressurizing a vessel containing the substance to be expanded to a pressure in the range of about 200-1,070 psi with carbon dioxide, immersing the substance in liquid carbon dioxide while maintaining the pressure within the vessel, thereby impregnating the substance with the liquid carbon dioxide, removing excess liquid carbon dioxide from the impregnation vessel, depressurizing the vessel to substantially atmospheric pressure, thereby causing liquefied carbon dioxide on and in the substance to solidify, removing the impregnated substance from the vessel, and heating the substance to cause expansion of the substance by at least 10%. In the process of this patent specification, the carbon dioxide used to pressurize the impregnation vessel is taken from the vapor space of the process vessel that is used to provide liquid carbon dioxide to the impregnation chamber. It is further stated in this patent specification that after removal of the liquid carbon dioxide from the impregnation chamber, the impregnation chamber may be vented to the atmosphere or to a carbon dioxide recovery system.

U.S. Pat. No. 4,165,618 discloses a process and system similar to that disclosed in UK patent specification 1,484,536 using a liquid cryogen, such as liquefied carbon dioxide. In the process of this Patent, the vessel in which the tobacco is impregnated is purged and pressurized by transferring gas from the vapor space of a liquid cryogen storage vessel to the impregnating vessel. Subsequent to pressurization, liquid cryogen is transferred to the impregnation vessel from the liquid storage vessel. The tobacco is permitted to soak in the liquid cryogen for a predetermined time period, after which it is returned to the liquid storage vessel. The gaseous cryogen remaining in the impregnation vessel after removal of the liquid cryogen is then transferred to a series of accumulators from which the gas is compressed and eventually returned to the main reservoir for the liquid cryogen.

The processes disclosed in these patents have the disadvantage that the gas used to purge and pressurize the impregnation vessel comes from the vapor space of the liquefied gas storage vessel. Unfortunately, removal of gas from the vapor space of this vessel reduces the pressure in the vessel, thereby disrupting the equilibrium balance in the vessel and causing liquid in the vessel to boil. This in turn cools the liquid. In order to restore the pressure and temperature in the vessel to the desired equilibrium value, it is necessary to frequently heat the liquid in the storage vessel Heating the contents of the storage vessel to maintain temperature and pressure equilibrium of the liquid and vapor in the vessel significantly increases the cost of the impregnation process.

In processes such as the one disclosed in U.S. Pat. No. 4,165,618, discussed above, in which the vented gas is recovered and, after being compressed, is returned to the storage vessel, some of the heat lost from the liquid cryogen may be replaced by the return of the hot compressed gas to the storage vessel. The gas is hot because its temperature is raised upon compression. However, the additional heat returned to the storage vessel from the compressed gas is inadequate to maintain the desired pressure and temperature equilibrium in the storage vessel. Consequently, it is still necessary to heat the liquid in the storage vessel to re-establish temperature and pressure equilibrium.

U.S. Pat. No. 3,771,533 discloses impregnation of tobacco with a mixture of ammonia and carbon dioxide, which react to form ammonium carbonate. The ammonium carbonate is thereafter decomposed by heat to release gases which expand the impregnated tobacco. U.S. Pat. No. 4,165,618 discloses the use of a variety of liquefied inert cryogens, including nitrogen, oxygen, argon, hydrogen, helium, methane, the freons, carbon monoxide and carbon dioxide as impregnants in the expansion of tobacco and like products.

In order to improve the economics of liquefied gas impregnation process, improvements that will lower the cost of processing, are continuously sought. The present invention provides an improvement that reduces the costs of impregnation processes.

OBJECTS OF THE INVENTION

It is an object of the invention to provide an improved method and apparatus for the expansion of cellular materials.

It is another object of the invention to provide a more efficient and economic process and improved apparatus for the expansion of cellular materials by means of a liquefied gas.

It is another object of the invention to provide an improved method for purging and equalizing the pressure in a chamber used to impregnate a cellular material with a liquefied gas.

It is another object of the invention to provide an improved method for reducing the variation of the temperature of a liquefied gas contained in the storage vessel of a cellular material impregnation system throughout the course of the impregnation process.

These and other objects and advantages of the invention will become apparent from the following description of the invention, taken in conjunction with the attached drawings

SUMMARY OF THE INVENTION

In accordance with the invention, an improvement in a process for expanding a cellular material is provided In its broadest embodiment, the process comprises the following steps: A cellular material is charged into an impregnation vessel which can be sealed from the environment. The impregnation vessel has an opening located in its upper region, near the top of the vessel, and an opening located near the bottom of the vessel. The upper opening of the impregnation vessel is positioned such that it will always remain above the top level of cellular material that is charged into the impregnation vessel for treatment. Upon charging the impregnation vessel with the cellular material, the vessel is sealed and purged with a low pressure inert gas. The pressure of the low pressure gas is not critical, but it is generally in the range of about 15 to 300 psia. During the purging step, air and other non-condensables are forced out of the impregnation vessel through the upper opening, and these substances are discharged to the atmosphere through an atmospheric vent. Upon completion of the purging step, the impregnation chamber is pressurized with the same inert gas but at a pressure substantially greater than the pressure of the inert gas used for purging the impregnation vessel. The pressure of the pressurization gas is at least as high as the pressure in the liquefied inert gas process vessel described below.

Following the pressurization step, the same inert gas in liquefied form is transferred from a process vessel in which it is stored to the impregnation vessel in a volume sufficient to completely submerge the cellular material in the liquefied inert gas. The liquefied inert gas in the process vessel is maintained at a pressure in the range of about 300 to about 1,200 psia, the selected pressure being dependent upon the liquefied gas being used, the cellular material being treated and other variables, such as the degree expansion desired. The temperature of the liquefied gas will be the temperature at which the liquefied inert gas and the inert gas in the vapor space above the liquefied inert gas are in equilibrium. This will, of course, depend upon the particular inert gas employed and the pressure existing in the process vessel. During the transfer of liquefied inert gas from the process vessel into the impregnation vessel, inert gas is permitted to circulate through the top opening of the impregnation vessel and back to the vapor space in the top of the process vessel. This enables the transfer to take place with little or no change of pressure in the process tank.

The liquefied inert gas is permitted to remain in the impregnation chamber for a sufficient period of time to permit it to penetrate to the desired extent into the cells of the cellular material. The liquefied inert gas is then transferred back to the process vessel by drainage or pumping. During this step, inert gas is permitted to transfer from the vapor space of the process vessel back to the impregnation vessel via the upper opening of the impregnation vessel, thus again ensuring that little or no change of pressure takes place in the process vessel.

After the excess liquefied inert gas is removed from the impregnation vessel, the inert gas remaining in this vessel is permitted to vent to the atmosphere. After the venting step is completed, the impregnation vessel can be opened and the cellular material removed therefrom. Upon reduction of the pressure in the impregnation vessel, some expansion of the cellular material may occur due to evaporation and expansion of the liquefied inert gas contained within the cells of the cellular material. While some of the inert gas evaporates, the remainder of it will remain in the liquid state or, depending on which inert gas is used, will solidify. The expansion process is completed by heating the cellular material, which causes the liquefied or solidified inert gas to vaporize or sublime, which, in turn, causes the pressure in the cells to greatly increase, and results in the expansion of the cellular material.

The inventive feature of the process of the invention is that the purging and pressurization steps are conducted with a source of inert gas which is completely independent of the inert gas contained within the process chamber. Thus, during the purging and pressurization steps, no inert gas will be withdrawn from the process vessel. Consequently, the pressure and temperature within the process vessel will not be affected by the purging and pressurization steps of the process. The variation of pressure and temperature of the liquefied gas in the process vessel is kept to a minimum since substantially the only inert gas or liquefied inert gas that is lost from this vessel is that which remains on or in the cellular material.

In a preferred embodiment of the invention, the inert gas that is vented from the impregnation vessel following the soaking step is recovered. This is accomplished by permitting the inert gas to vent from the impregnation chamber into a low pressure inert gas storage vessel. This vessel may be the same vessel that is used as the source of inert gas for the purging step.

In another preferred embodiment of the invention, the high pressure inert gas that is used to pressurize the impregnation vessel is provided by taking inert gas from the low pressure inert gas storage vessel, compressing it to the desired pressure and transferring it to the high pressure inert gas storage vessel used for containing the pressurization gas.

In other preferred embodiments of the invention, the cellular material may be tobacco or other smoking material or a dried food product, such as dried fruits, dried vegetables, dried meats, or dried cereals; and the inert gas may be air, carbon dioxide, nitrogen, oxygen, argon, halogenated hydrocarbons, ammonia, lower alkanes or mixtures of these.

In the most preferred embodiment of the invention, the cellular material is tobacco and the inert gas is carbon dioxide.

The apparatus of the invention comprises an impregnation vessel that can be sealed from the environment after it is charged with cellular material, a liquefied inert gas process vessel, conduit and pumping means for transferring the liquefied inert gas from the process vessel into the impregnation vessel and back, conduit and valving means to permit inert gas to transfer back and forth between the impregnation vessel and the upper part of the process vessel and storage, conduit and valve means, independent of the process vessel, for providing and transferring purging gas and pressurization gas to the impregnation vessel. In a preferred embodiment of the apparatus aspect of the invention, means is provided to vent the impregnation vessel to a storage vessel for the low pressure inert gas used for purging the impregnation vessel. In another preferred embodiment of the apparatus aspect of the invention, means is provided for compressing inert gas taken from the low pressure inert gas storage vessel and transferring the compressed inert gas to a storage vessel for the high pressure gas used for pressurizing the impregnation vessel.

BRIEF DESCRIPTION OF THE DRAWINGS

The invention is illustrated in the drawings, in which.

Like characters designate like or corresponding parts throughout the several views.

DETAILED DESCRIPTION OF THE PREFERRED EMBODIMENT

The present invention provides a method of impregnating a cellular material with a liquefied gas and expanding the cellular material to the desired density by vaporizing the impregnated liquefied gas. The invention may be applied to the expansion of any cellular material that is capable of expansion. The invention is particularly suitable for the expansion of tobacco and other smoking materials and food products, including dried fruits, meat and cereals. The invention is particularly suitable for the expansion of tobacco.

The agent used in the expansion of the cellular material may be any inert, normally gaseous fluid, i.e. any fluid that will not react with or otherwise adversely affect the cellular material and thereby interfere with its intended use. Preferred inert gases are those that can be liquefied and solidified at temperatures and pressures contemplated in the process of the invention. Typical of inert gas fluids useful in the invention are air, carbon dioxide, chloronated hydrocarbons, such as the fluorochlorohydrocarbons used as refrigerants and more commonly known as freons, nitrogen, oxygen, argon, hydrogen, helium, ammonia and the lower alkanes, i.e., those having 1 to 6 carbon atoms, such as methane, etc. Mixtures of these gases may also be used where they are compatible. The preferred inert gas is carbon dioxide because it is environmentally safe, is easily liquefied and solidified, easily penetrates the pores of cellular material, and, in general, has no adverse effect on the cellular materials being expanded. In the discussion which follows, the term "inert gas" is used to designate the particular inert gas in gaseous form and the term "liquefied inert gas" is used to describe the inert gas in liquefied form.

The invention is particularly described as it applies to the expansion of tobacco with liquefied carbon dioxide, however, it is to be understood that the process and apparatus of the invention can be used to expand any cellular material with any liquefied inert gas.

Figure 1:
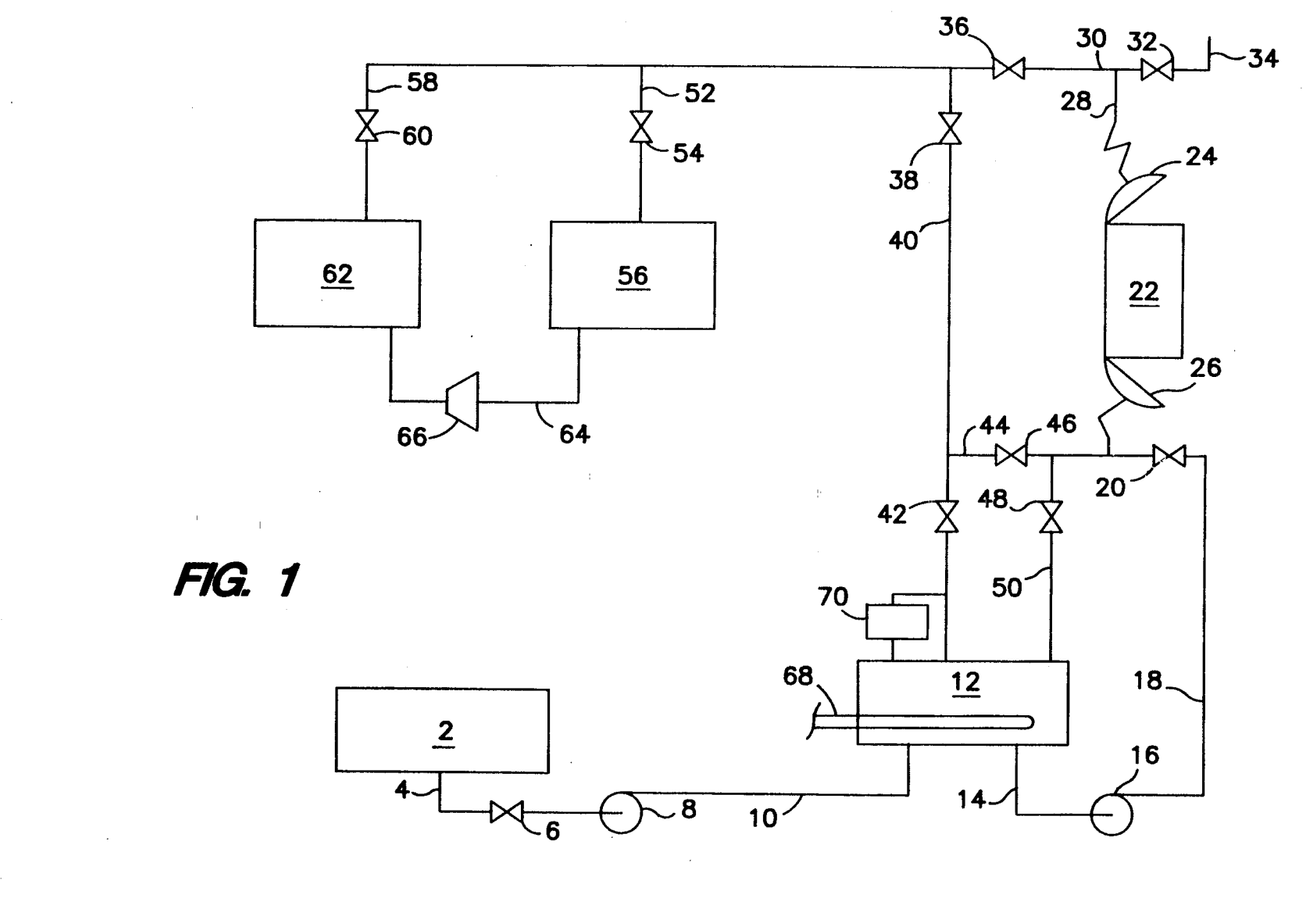
FIG. 1 depicts a preferred embodiment of a system for impregnating a cellular material with a liquefied gas in accordance with the principle of the invention.

Referring now to FIG. 1, which illustrates a preferred embodiment of the invention, the principle apparatus components comprising the invention are a liquefied inert gas storage vessel 2, a liquefied inert gas process vessel 12, a cellular material impregnation chamber 22, a low pressure inert gas accumulator 56, and a high pressure inert gas accumulator 62. Storage vessel 2 is connected on its lower end to the suction end of high pressure pump 8 through line 4, flow through which is controlled by valve 6. Pump 8 discharges into line 10 which, in turn, is connected to the bottom of liquefied inert gas process vessel 12. Liquid flow line 14 connects the bottom of process vessel 12 with the suction end of high pressure pump 16. Pump 16 discharges fluid into line 18, which is connected to the lower extremity of cellular material impregnation chamber 22. Fluid flow through line 18 is controlled by valve 20. Impregnation chamber 22 is fitted with upper closure 24 and lower closure 26. Closures 24 and 26 are adapted to tightly seal openings on the top and bottom, respectively, of chamber 22.

Inert gas line 28 connects the top of impregnation chamber 22 to branched line 30. One branch of line 30 is connected through valve 32 to atmospheric vent 34. The other branch of line 30 is connected through valve 36 to lines 40, 52 and 58. Valve 38 controls the flow of fluid in line 40, which is connected at its lower end to the top of process vessel 12. Valve 42 controls the flow of gas through line 40. Line 44 branches off line 40 between valves 38 and 42 and it joins line 18 at the lower end of impregnation chamber 22. Flow through line 44 is controlled by valve 46. A liquefied gas return line 50 connects the bottom of impregnation chamber 22 with process vessel 12. Flow through line 50 is controlled by valve 48.

Line 52, controlled by valve 54, connects inert gas line 30 with low pressure inert gas accumulator 56, and line 58, controlled by valve 60, connects line 30 with high pressure inert gas accumulator 62. Line 64 connects low pressure accumulator 56 with the low pressure side of compressor 66. The high pressure side of compressor 66 is connected to high pressure inert gas accumulator 62. Process vessel 12 may be additionally provided with a liquefied gas heater 68 and a condenser 70.

Storage vessel 2, which may take the form of a conventional tank serves to store the liquefied gas used in the system. Vessel 2 is designed to withstand a pressure of at least 300 psia. Process vessel 12, on the other hand, is designed to withstand significantly greater pressures than vessel 2 is exposed to, e.g. it must withstand pressures up to about 1,200 psia or more. Pumps 8 and 16 are conventional cryogenic pumps that are designed to pump liquids against high pressures, e.g. to supply liquefied inert gas at pressures of up to 1,200 psia or more. Storage vessel 2 is used to replenish liquefied gas to process vessel 12 as required during the course of the impregnation process.

The process of the invention will now be described with tobacco as the cellular material and carbon dioxide as the inert gas. In a typical system, the liquefied carbon dioxide in inert gas storage vessel 2 is at a pressure of about 275 psia and an equilibrium temperature of about $-6°$ F. ($-21°$ C.). The liquefied carbon dioxide in process vessel 12 is generally maintained in equilibrium at a pressure of about 400 psia. The equilibrium temperature of carbon dioxide at 400 psia is approximately 17° F. ($-9.9°$ C.). During the course of the process the temperature of the liquefied gas in vessel 12 may fall below the equilibrium value. In this event, it will be necessary to heat the liquid in vessel 12 to raise it back up to the desired temperature. Heater 68 can be used for this purpose.

In accordance with a preferred embodiment, bottom closure 26 of impregnation chamber 22 is closed and sealed and top closure 24 is opened. A predetermined amount of tobacco is charged into impregnation vessel chamber 22 through closure 24 and this closure is then closed and sealed. Chamber 22 is then purged with low pressure carbon dioxide taken from accumulator 56. In carrying out this step, valves 54, 38, 46, and 32 are opened. All other valves remain closed. Low pressure carbon dioxide is then transferred from accumulator 56 through lines 52, 30, 40 and 44 and into chamber 22. The carbon dioxide gently rises in chamber 22 thereby expelling air and other noncondensable gases from chamber 22 through line 28. These gases vent to the atmosphere through vent 34.

At the completion of the purge step, valves 32, 38 and 46 are closed and valve 36 is opened. Low pressure carbon dioxide continues to flow from accumulator 56 into impregnation chamber 22 via lines 52, 30 and 28 until the pressure in chamber 22 equals the pressure in accumulator 56. Thereupon, valve 54 is closed and valve 60 is opened. The pressure of the carbon dioxide in accumulator 62 is approximately equal to the pressure existing in process vessel 12. Upon opening valve 60, equalization of the pressure in accumulator 62 and impregnation chamber 22 is effected. When pressure equalization is attained, valve 60 is closed. The use of accumulator 56 for pressurization is optional, i.e. impregnation chamber 22 may be completely pressurized by means of accumulator 62 alone.

In the next phase of the process, liquefied carbon dioxide is transferred to chamber 22. This is accomplished by opening valves 38, 42, and 20 and energizing pump 16. Valve 36 remains open from the previous step and all other valves remain closed. Liquid carbon dioxide then flows through lines 14 and 18 and into chamber 22. As the liquid carbon dioxide level rises in chamber 22, the gaseous carbon dioxide formerly occupying chamber 22 is forced out of chamber 22 through line 28 and it then passes through lines 30 and 40 and into the vapor space of process vessel 12. During this phase of the operation, the pressure in process vessel 12 remains substantially constant since the liquid and gaseous carbon dioxide are circulated through a closed system and the pressure is equal throughout the closed system. When the liquid carbon dioxide rises to the desired level in chamber 22, pump 16 is deenergized and valve 20 is closed. The tobacco is then permitted to soak in the liquefied carbon dioxide for a predetermined dwell time, which may range from about 1 second to about 1 hour or more. In general, a soaking period of a few seconds, i.e. about 1 to about 10 seconds, is generally sufficient to infuse enough liquefied carbon dioxide into the tobacco to produce the desired result.

Upon completion of the impregnation stage, valve 48 is opened and the liquid carbon dioxide in vessel 22 drains back to process vessel 12 through line 50. It can be appreciated that to effect complete drainage by gravity flow, impregnation chamber 22 must be located at a higher elevation that process vessel 12. If this is not the case, then a pump must be positioned in line 50 to pump liquid carbon dioxide back to vessel 12. It can also be appreciated that, although not illustrated, line 50 may be connected to the suction side of pump 16 and a branch line from line 16, with appropriate valving, can be used to return liquefied carbon dioxide to vessel 12. Similarily, other equivalent arrangements can be employed. As the liquefied carbon dioxide drains from chamber 22 and back into vessel 12, gaseous carbon dioxide is forced from the vapor space of vessel 22 and back to impregnation chamber 22 via lines 40, 30 and 28. During this stage of the process, the pressure in chamber 22 and vessel 12 and the connecting lines remains substantially constant.

Upon completion of the impregnation stage of the process as practiced in the system illustrated in FIG. 1, valves 38, 42 and 48 are closed and valve 54 is opened. This causes gaseous carbon dioxide to flow from impregnation chamber 22, through lines 28, 30 and 52 and into low pressure accumulator 56. As the carbon dioxide leaves impregnation chamber 22, the pressure in this chamber will drop, thereby causing some of the liquefied carbon dioxide on and in the cells of the tobacco to flash to vapor and some of it to solidify. The gaseous carbon dioxide released by the vaporization is likewise recovered in accumulator 56. The flow of gaseous carbon dioxide will continue until the pressure in chamber 22 and the pressure in accumulator 56 becomes equal. If it is desired to recover additional carbon dioxide from chamber 22, an exhaust pump (not shown) may be installed in line 30 to further exhaust chamber 22 of carbon dioxide. The volume of carbon dioxide received from chamber 22 is generally adequate for the purging and pressurization steps of the next cycle. If desired, additional carbon dioxide can be added to accumulators 56 and 62 from an external source (not shown). Upon completion of transfer of carbon dioxide from chamber 22 to vessel 56, valves 54 and 36 are closed and valve 32 is opened, thereby permitting the residual carbon dioxide in chamber 22 to vent to the atmosphere.

When chamber 22 reaches atmospheric pressure, lower door 26 can be opened and the tobacco can be removed from the chamber After the tobacco is removed from chamber 22, it can be expanded by heating it with a hot gas such as air or mixtures of steam and air. Heating the tobacco causes the solidified carbon dioxide in the cells to sublime and any residual liquefied carbon dioxide in the cells to vaporize The sudden increase of gas in the cells from the sublimation and vaporization causes the tobacco to expand.

Pressurizing chamber 22 with carbon dioxide gas from high pressure accumulator 62 depletes this vessel of carbon dioxide. Accumulator 62 can be recharged with carbon dioxide by compressing some of the carbon dioxide in accumulator 56 and transferring it to vessel 62. This is accomplished by means of compressor 66.

Figure 2:
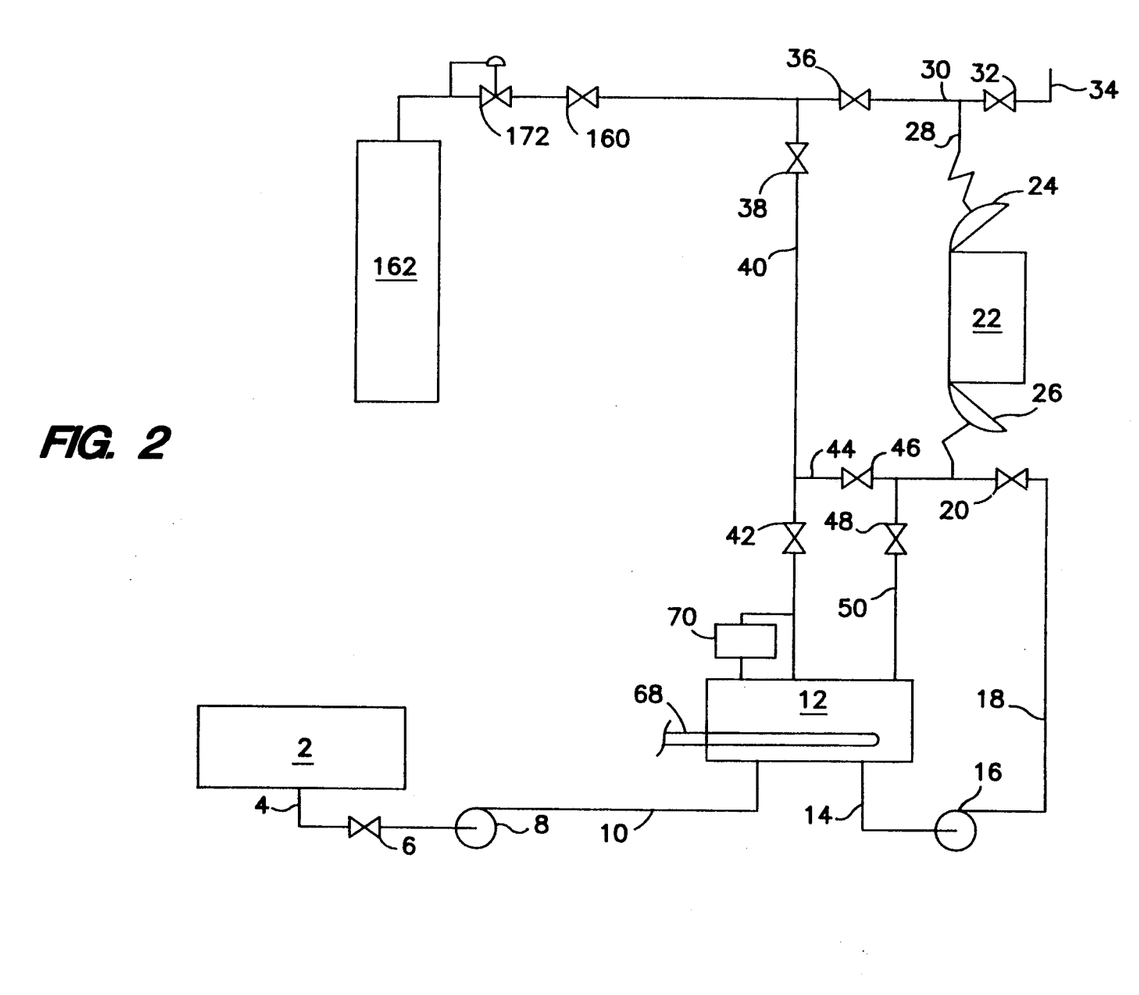
FIG. 2 illustrates a variation of the apparatus illustrated in FIG. 1.

In some cases it may not be necessary or desirable to recover the residual carbon dioxide remaining in chamber 22 after the soaking step. In this case, the recovery system comprising accumulators 56 and 62 and compressor 66 may be eliminated and replaced with an external source of carbon dioxide. FIG. 2 illustrates this embodiment of the invention. The apparatus in FIG. 2 is the same as the apparatus shown in FIG. 1, with the exception that accumulators 56 and 62 are replaced by vessel 162, which contains carbon dioxide at a pressure equal to or greater than the pressure in process vessel 12, valve 60 becomes valve 160 and pressure regulator 172 is provided in line 30 between valve 160 and vessel 162.

In the process of the invention as practiced in FIG. 2, tobacco is charged into impregnation chamber 22 and chamber 22 is then sealed, as described in the process as practiced in FIG. 1. Valves 32, 38, 46 and 160 are then opened and pressure regulator 162 is set at a pressure low enough to gently purge chamber 22. All other valves in this system are closed at this time. Carbon dioxide then passes from vessel 162, through lines 30, 40 and 44 and into impregnation chamber 22. The carbon dioxide gently rises in chamber 22 and forces air and other non-condensables out of chamber 22 and into line 28. The carbon dioxide then passes through line 30 and leaves the system through atmospheric vent 34. Upon completion of the purge step, valves 32, 38 and 46 are closed, valve 36 is opened and pressure regulator 172 is adjusted to the pressure of the carbon dioxide contained in process vessel 12. Carbon dioxide then passes from vessel 162 and into chamber 22 via lines 30 and 28. The flow of carbon dioxide into chamber 22 is permitted to continue until the pressure in chamber 22 reaches the pressure in process vessel 12. At this point, valve 160 is closed and valves 20, 38 and 42 are opened, and pump 16 is energized, thereby causing liquefied carbon dioxide to flow into chamber 22 to impregnate the tobacco contained therein. The soaking step of the process of the system of FIG. 2 is the same as the process of the system illustrated in FIG. 1. Upon completion of the tobacco soaking step, and subsequent draining of chamber 22, valve 32 is opened and chamber 22 is vented to the atmosphere through lines 28 and 30 and vent 34. The remainder of the process is identical to the process described in the system of FIG. 1.

Although the process illustrated in FIG. 2 is not as economical as the process of FIG. 1 from an operational standpoint, the equipment of FIG. 2 requires a lower capital expenditure and is simplier to operate than the system of FIG. 1.

Upon completion of the impregnation cycle in the systems of FIG. 1 or FIG. 2, the process may be repeated by repeating the tobacco filling, purging, pressure equalization, impregnation, and evacuation steps described above. If desired, the process can be carried out with multiple impregnation chambers. In this case, it is generally desirable to operate the impregnation chambers on alternate cycles, i.e. as one chamber is being filled with tobacco, the tobacco in another impregnation chamber is being impregnated with liquid carbon dioxide, a third impregnation chamber is being evacuated, etc. In other words, each impregnation chamber is going through a different stage of the impregnation cycle at any given time.

It is readily apparent from the description of the impregnation process set forth above that the pressure in process vessel 12 undergoes very little variation due to gas removal during the course of the impregnation cycle, since no carbon dioxide is drawn from this vessel for the impregnation chamber purging and pressure equalization steps. Accordingly, there is a marked reduction in the amount of heat that must be provided to vessel 12 via heater 68 in order to maintain this vessel at a substantially constant pressure. Thus, the invention provides a significant reduction in operating costs, vis-a-vis the prior art processes.

Although the invention is described with particular reference to specific embodiments, it can be appreciated that variations of these embodiments are contemplated. For example, as noted above, multiple impregnation vessels can be used in parallel, or the system can be used with liquefied gases other than carbon dioxide and equipment arrangements different from those illustrated in the drawings can be employed. Similarly, the process of the invention can be used to expand cellular material other than tobacco. Furthermore, if desired, liquefied gas can be condensed from high pressure accumulator 62 and returned to storage vessel 2. The scope of the invention is delimited only by the breadth of the appended claims.

I claim:

1. A process for impregnating a cellular material with liquefied gas at a predetermined pressure comprising the steps of charging the cellular material into an impregnation vessel, purging the impregnation vessel with inert gas, pressurizing the impregnation vessel with inert gas to said predetermined pressure, transferring liquefied inert gas into the impregnation vessel from a process vessel in which the liquefied gas is stored at said predetermined pressure, soaking the cellular material in the liquefied inert gas for a predetermined time period, transferring unabsorbed liquefied gas from the impregnation vessel to the process vessel, depressurizing the impregnation vessel by venting the inert gas therefrom and removing the impregnated cellular material from the impregnation vessel, the inert gas used to purge and pressurize the impregnation vessel being taken from a source independent of the liquefied inert gas contained in the process vessel, the pressure in said process vessel being maintained substantially constant at said predetermined pressure during the transfer of liquefied inert gas back and forth between said impregnation vessel and said process vessel and during said cellular material soaking step.

2. The process of claim 1, wherein said inert gas is selected from air, carbon dioxide, nitrogen, oxygen, argon, halogenated hydrocarbons, ammonia, lower alkanes and mixtures of these.

3. The process of claim 1, wherein said cellular material is selected from fruits, vegetables, meats, cereals and tobacco.

4. The process of claim 1, wherein said cellular material is tobacco.

5. The process of any one of claims 1, 3 or 4, wherein said inert gas is carbon dioxide.

6. The process of any one of claims 1, 3 or 4, wherein the gas used to purge said impregnation chamber is at a pressure of about 15 to 300 psia.

7. The process of claim 6 wherein the purge gas is obtained from a purge gas storage vessel maintained at a pressure lower than said predetermined pressure.

8. The process of any one of claims 1, 3 or 4, wherein the inert gas used to pressurize the impregnation vessel is at a pressure of about 300 to 1,200 psia.

9. The process of claim 8, wherein the inert gas used to pressurize said impregnation vessel is obtained from a pressurization gas storage vessel maintained at a pressure at or above said predetermined pressure.

10. The process of claim 9, wherein the inert gas released from said impregnation vessel during the depressurization step is vented to said purge gas storage vessel.

11. The process of claim 10, wherein the inert gas in said pressurization gas storage vessel is replenished by compressing gas from said purge gas storage vessel and transferring the compressed gas to said pressurization gas storage vessel.

12. A process for expanding tobacco comprising:
(a) charging tobacco into a sealable impregnation chamber having a fluid inlet and a fluid outlet, said fluid inlet being located in the lower region of the impregnation chamber and said fluid outlet being located above the upper surface limit of tobacco in said impregnation chamber;
(b) purging the impregnation chamber with gaseous carbon dioxide at a pressure in the range of about 15 to 300 psia obtained from a source independent of the process vessel defined in step (c);
(c) pressurizing the purged impregnation chamber with gaseous carbon dioxide to a value substantially equal to the pressure in a process vessel containing a substantially equilibrium mixture of gaseous carbon dioxide and liquefied carbon dioxide, the inert gas used to pressurize said impregnation chamber being obtained from a source independent of said process vessel;
(d) transferring liquefied carbon dioxide from said process vessel into said impregnation chamber through said fluid inlet while permitting the gaseous carbon dioxide in said impregnation vessel to transfer through said fluid outlet to the vapor space in said process vessel;
(e) maintaining the liquefied carbon dioxide in said impregnation vessel sufficiently long to permit liquefied carbon dioxide to penetrate into the cells of the tobacco;
(f) transferring liquefied carbon dioxide from said impregnation vessel to said process vessel through said fluid inlet while permitting carbon dioxide in said process vessel to transfer to said impregnation vessel through said fluid outlet;
(g) reducing the pressure in said impregnation vessel sufficiently to effect solidification of liquefied carbon dioxide contained within the cells of said tobacco; and
(h) heating the tobacco sufficiently to vaporize carbon dioxide contained in the cells of said tobacco, thereby expanding said tobacco;
the pressure in said process vessel being maintained substantially at said value during steps (d) to (f).

13. The process of claim 12, wherein the gaseous carbon dioxide used to purge said impregnation chamber is obtained from a first carbon dioxide storage vessel.

14. The process of claim 13, wherein the pressure in said first carbon dioxide storage vessel is maintained lower than the pressure in said process vessel.

15. The process of claim 12, wherein the gaseous carbon dioxide used to pressurize the sealed impregnation chamber is obtained from a second carbon dioxide storage vessel.

16. The process of claim 15, wherein the pressure in said second carbon dioxide storage vessel is at or above the pressure in said process vessel.

17. The process of claim 16, wherein the gaseous carbon dioxide released from said impregnation chamber during the pressure reducing step is vented to said first carbon dioxide storage vessel.

18. The process of claim 17, wherein the gaseous carbon dioxide in said second carbon dioxide storage vessel is replenished by compressing gaseous carbon dioxide from said first carbon dioxide storage vessel and transferring the compressed gaseous carbon dioxide to said second carbon dioxide storage vessel.

19. In a process for expanding a cellular material comprising:
(a) charging the cellular material into a sealable impregnation vessel having a fluid inlet and a fluid outlet, said fluid outlet being located in the upper part of said impregnation chamber;
(b) purging the impregnation chamber with inert gas;
(c) pressurizing the purged impregnation vessel with said inert gas to a value substantially equal to the pressure in a process vessel containing a substantially equilibrium mixture of said inert gas in gaseous and liquefied form;
(d) transferring liquefied inert gas from said process vessel to the pressurized impregnation vessel through said fluid inlet while permitting inert gas to transfer from said impregnation chamber through said fluid outlet to the vapor space of said process vessel;
(e) maintaining the liquefied inert gas in said impregnation chamber sufficiently long to permit liquefied inert gas to penetrate into the cells of said cellular material;
(f) transferring said liquefied inert gas from said impregnation chamber through said fluid inlet to said process vessel while permitting inert gas to transfer from said process vessel to said impregnation vessel though said fluid outlet;
(g) reducing the pressure in said impregnation vessel; and
(h) heating said cellular material sufficiently to vaporize liquefied and solidified inert gas contained within the cells of said cellular material, thereby expanding said cellular material;
the improvement comprising conducting the impregnation chamber purging and pressurization steps with a source of inert gas that is independent of the inert gas contained in said process vessel and maintaining the pressure in said process vessel substantially constant at said value during steps (d), (e) and (f).

20. In a process for expanding tobacco comprising the steps of charging tobacco into a sealable impregnation vessel, purging the impregnation vessel with carbon dioxide, pressurizing the purged impregnation vessel with high pressure carbon dioxide, transferring a sufficient quantity of liquefied carbon dioxide from a process vessel containing a high pressure equilibrium mixture of gaseous and liquid carbon dioxide into said impregnation vessel to substantially completely submerge said tobacco in liquefied carbon dioxide, maintaining the liquefied carbon dioxide in said impregnation vessel sufficiently long to permit liquefied carbon dioxide to penetrate into the cells of said tobacco, transferring the liquefied carbon dioxide in said impregnation vessel back to said process vessel, venting said impregnation vessel to reduce the pressure therein to substantially atmospheric pressure, and heating the tobacco sufficiently to vaporize liquefied and solidified carbon dioxide contained in the cells of the tobacco, thereby expanding the tobacco, the improvement comprising using low pressure gaseous carbon dioxide from a source independent of said process vessel to purge the impregnation vessel and using high pressure gaseous carbon dioxide from a source independent of said process vessel to pressurize the impregnation vessel, and maintaining gas communication between the impregnation vessel and the process vessel during the transfer of liquefied carbon dioxide between said process vessel and said impregnation vessel, thereby maintaining a substantially constant pressure in said process vessel throughout the process.

21. Apparatus for impregnating a cellular material with a liquefied gas without substantial change of the temperature of said liquefied gas comprising:
  (a) an impregnation vessel having sealable means for charging cellular material into said impregnation vessel and sealable means for discharging cellular material from said impregnation vessel;
  (b) a liquefied inert gas process vessel equipped with heat transfer means;
  (c) means for transferring liquefied inert gas back and forth between said liquefied inert gas process vessel and said impregnation vessel;
  (d) means providing fluid communication between the upper region of said impregnation vessel and the upper region of said liquefied inert gas process vessel and adapted to maintain a substantially constant pressure in said liquefied inert gas process vessel during the transfer of liquefied inert gas back and forth between said impregnation vessel and said liquefied inert gas process vessel;
  (e) means independent of said liquefied inert gas process vessel for purging said impregnation vessel with low pressure inert gas;
  (f) means independent of said liquefied inert gas process vessel for pressurizing said impregnation vessel with high pressure inert gas to a pressure substantially equal to the pressure in said liquefied inert gas process vessel; and
  (g) means for venting said impregnation vessel.

22. The apparatus of claim 21, wherein said vent means is in fluid communication with said means for purging said impregnation vessel.

23. The apparatus of claim 22 additionally comprising means for compressing inert gas vented from said impregnation vessel and transferring the compressed inert gas to said means for pressurizing said impregnation vessel.

24. The apparatus of claim 21 wherein said means for purging said impregnation vessel and said means for pressurizing said impregnation vessel comprises a high pressure inert gas storage means and a pressure regulating means.

* * * * *

UNITED STATES PATENT AND TRADEMARK OFFICE
CERTIFICATE OF CORRECTION

PATENT NO. : 5,143,096
DATED : September 1, 1992
INVENTOR(S) : Ira Steinberg

It is certified that error appears in the above-indentified patent and that said Letters Patent is hereby corrected as shown below:

Column 6, line 5, delete "chloronated" and substitute --chlorinated-- therefor.

Column 8, line 22, delete "that" and substitute --than-- therefor.

Column 8, line 29, delete "Similarily" and substitute --Similarly-- therefor.

Column 9, line 60, delete "simplier" and substitute --simpler-- therefor.

Column 10, line 27, delete "Similarily" and substitute --Similarly-- therefor.

Column 11, line 40, delete "inert gas" and substitute --gaseous carbon dioxide-- therefor.

Signed and Sealed this

Nineteenth Day of April, 1994

Attest:

BRUCE LEHMAN

*Attesting Officer*     Commissioner of Patents and Trademarks